United States Patent [19]
Wax et al.

[11] Patent Number: 6,108,557
[45] Date of Patent: Aug. 22, 2000

[54] SIGNATURE MATCHING FOR LOCATION DETERMINATION IN WIRELESS COMMUNICATION SYSTEMS

[75] Inventors: Mati Wax, San Ramon; Oliver A. Hilsenrath, Alamo, both of Calif.

[73] Assignee: US Wireless Corporation, San Ramon, Calif.

[21] Appl. No.: 09/025,643

[22] Filed: Feb. 18, 1998

Related U.S. Application Data

[63] Continuation-in-part of application No. 08/780,565, Jan. 7, 1997.

[51] Int. Cl.$^7$ ...................................................... H04Q 7/20
[52] U.S. Cl. ........................................... 455/456; 455/422
[58] Field of Search .................................... 455/422, 456, 455/500, 91, 103; 379/114, 63; 701/213, 214; 342/463, 457, 387, 451

[56] References Cited

U.S. PATENT DOCUMENTS

| 5,327,144 | 7/1994 | Stilp et al. | 342/387 |
| 5,512,980 | 4/1996 | Herrick | 342/387 |
| 5,570,412 | 10/1996 | LeBlanc | 379/58 |
| 5,602,903 | 2/1997 | Leblanc et al. | 342/457 |
| 5,608,410 | 3/1997 | Stilp et al. | 342/387 |
| 5,634,199 | 5/1997 | Gerlach et al. | 455/63 |

*Primary Examiner*—Dwayne D. Bost
*Assistant Examiner*—Linwood C. Scott, Jr.
*Attorney, Agent, or Firm*—Lumen Intellectual Property Services

[57] ABSTRACT

A method and apparatus improves the accuracy of a wireless location finding system based on the use of multipath signal signatures. A location finding apparatus measures an array covariance matrix R of a signal. The covariance matrix is compared to a database of signatures comprising calibrated signal subspaces. The comparison is based on calculating the projection of R onto each calibrated subspace. From these calculations a set of likely locations is then determined.

17 Claims, 5 Drawing Sheets

SIGNATURE MATCHING FOR LOCATION DETERMINATION IN WIRELESS COMMUNICATION SYSTEMS

This application is a continuation-in-part of U.S. Pat. Application Ser. No. 08/780,565, filed Jan. 7, 1997, which is incorporated herein by reference.

FIELD OF THE INVENTION

This invention relates generally to methods for passively determining the location of a radio transmitter. More particularly, it relates to computationally inexpensive methods for accurately determining cellular telephone locations in real time.

BACKGROUND OF THE INVENTION

In wireless radio communication systems, such as cellular telephone networks, it is generally recognized that there is a great need and utility for accurately determining in real time the location of mobile radio transmitters, such as cellular phone handsets and pagers. For example, U.S. Pat. No. 5,512,908 to Herrick mentions the application of cellular location information to 911 dispatching, tracking unauthorized cell phone usage, and tracking or locating commercial and/or government vehicles. U.S. Pat. No. 5,327,144 to Stilp et al. also mentions various applications of mobile location information, such as locating lost or stolen vehicles, assisting lost motorists, and dispatching emergency vehicles.

All of the above location-based services, however, fundamentally depend on the ability to obtain consistent and accurate location information in a wide range of environments. Although conventional techniques for location finding can provide location information in certain limited situations, they fail to provide accurate location information in many environments, particularly in urban environments where signal multipath is often severe. Urban environments, however, are the places where such services are often needed most.

In contrast to conventional techniques for location finding, Hilsenrath et al. in U.S. Pat. Application Ser. No. 08/780,565 disclose a unique method for location finding that performs especially well in multipath environments, and requires only a single base station. While conventional wisdom views multipath signals as noise to be reduced, ignored, or eliminated, the method of Hilsenrath et al. takes advantage of multipath signals to help identify transmitter locations. Because signal signatures are naturally associated with locations by virtue of the spatial dependence of multipath, the base station can use this fact to determine a location by matching a measured signature with a particular calibrated signature in a database of signatures and corresponding locations.

Due to noise and other uncertainties, however, it can be difficult to ensure a reliable and unique match between a measured signature and one of the calibrated signatures, and thus obtain accurate and unambiguous location information.

SUMMARY OF THE INVENTION

Accordingly, it is a primary object of the present invention to provide a method for improving the accuracy of location determinations in wireless communications systems. In one aspect of the invention, a method is provided for calculating a set of likely locations of a transmitter. The method comprises the steps of (a) measuring at a base station a signal covariance R associated with the transmitter; (b) evaluating a function $L_R(i)$ comparing R with a calibrated subspace associated with a location index i; (c) evaluating a function $L_{R_k}'(i)$ comparing $R_k'$ with the calibrated subspace associated with location index i, where $R_k'$ is a calibrated covariance associated with a location index k; (d) calculating a distance G between the functions $L_R$ and $L_{R_k}'$; and (e) selecting a set of location indices k such that the distance G between $L_R$ and $L_{R_k}'$ is small. In a preferred embodiment, the value of $L_R(i)$ is the trace of the projection of R onto a calibrated subspace associated with location index i, and the value of $L_{R_k}'(i)$ is the trace of the projection of $R_k'$ onto a calibrated subspace associated with location index i. In another embodiment the value of $L_R(i)$ is the product of the non-zero eigenvalues of the projection of R onto a calibrated subspace associated with location index i, and similarly for $L_{R_k}'(i)$. The distance G in the preferred embodiment is the Kullback-Liebler distance between $L_R$ and $L_{R_k}'$. In another embodiment the distance G is the squared difference between $L_R$ and $L_{R_k}'$.

DETAILED DESCRIPTION

Although the present detailed description contains many specifics for the purposes of illustration, anyone of ordinary skill in the art will appreciate that many variations and alterations to the details are within the scope of the invention. Accordingly, the following embodiments of the invention are set forth without any loss of generality to, and without imposing limitations upon, the claimed invention.

Figure 1:
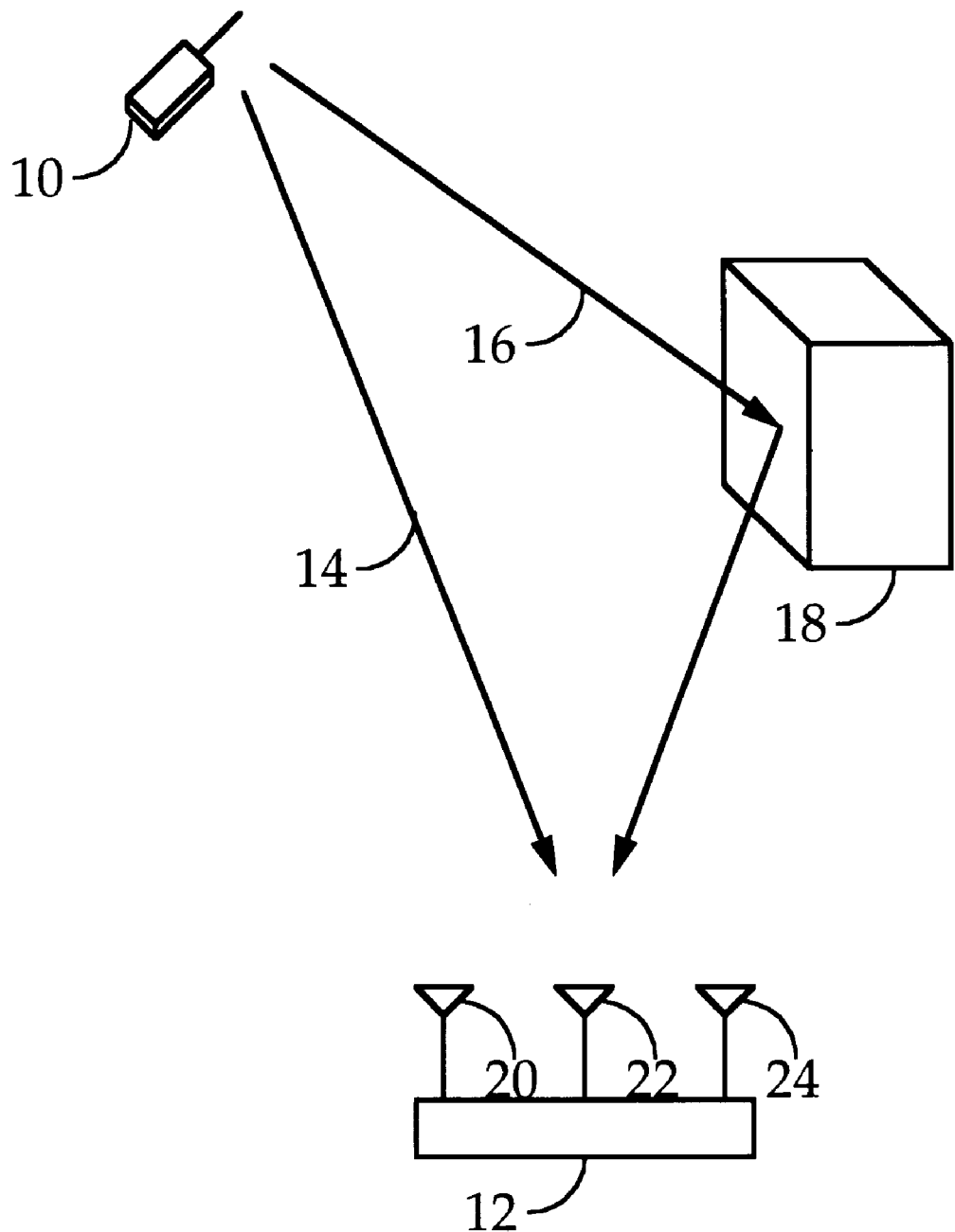
FIG. 1 illustrates a wireless communication system according to the present invention.

In a communication system according to a preferred embodiment of the invention, a cellular telephone 10 transmits a signal which travels through an environment and couples to an array of antennas 20, 22, 24 of a cellular telephone base station 12, as shown in FIG. 1. Typically, in addition to a direct path signal 14 from phone 10 to base 12, there may be additional multipath signals reflected from various environmental objects, for example, multipath signal 16 reflected from object 18.

Figure 2:
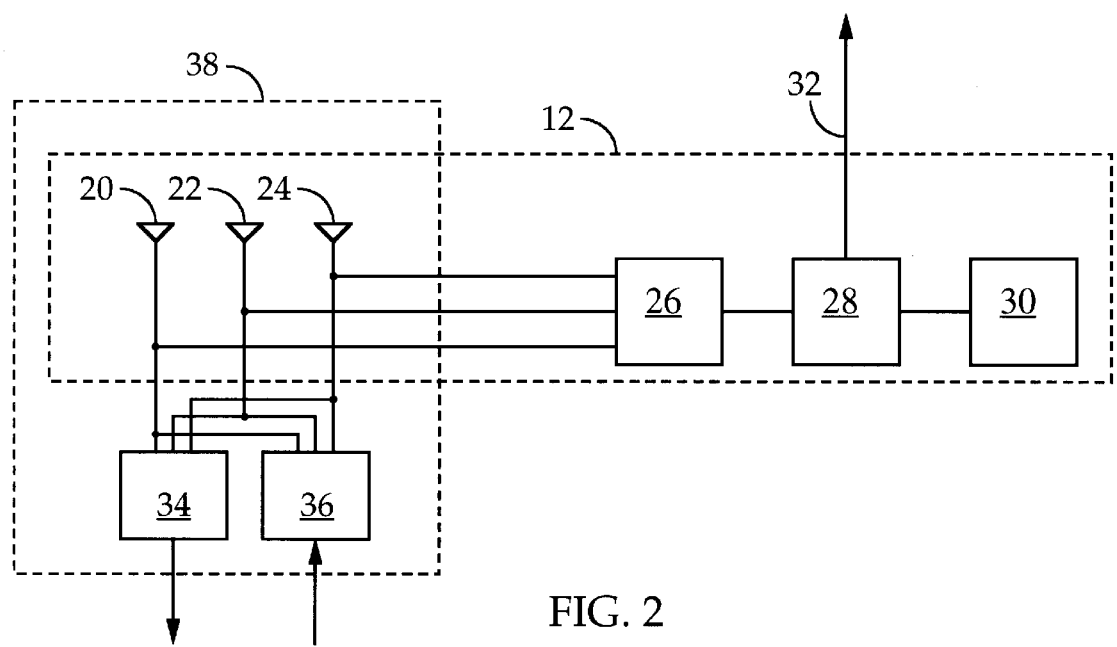
FIG. 2 is a block diagram of a location finding apparatus and base station according to the present invention.

As shown in FIG. 2, a location finding apparatus 12 includes a conventional multichannel receiver 26 which coherently receives signals from the antennas 20, 22, 24. The received signals are sent to multi-purpose signal processor 28 which performs signal signature identification, database searching, and other required processing as will be described in detail below. A memory device 30 is accessible by processor 28 and is used to store signal signature calibration data, location data, geographical map data, and/or other data as required. Location information determined by processor 28 is sent over external communication lines 32 for use by other systems. In the present embodiment, location finding apparatus 12 shares antennas with an existing cellular telephone base station 38, which has a multi-channel receiver 34 and multi-channel transmitter 36, among other components well-known in the art (not shown). Note, however, that location finding apparatus 12 need not be connected to an existing cellular base station 38, but can operate as a stand-alone device with its own antennas.

In general, the base station 12 has a number p of antennas forming an array. For illustrative purposes, however, the array is shown in the figures as having three antennas 20, 22, and 24. The p antennas are used to receive complex signal envelopes $x_1(t)$, $x_2(t)$, ..., $x_p(t)$, respectively, which are conventionally grouped together to form a p-dimensional array vector $x(t)=[x_1(t), x_2(t), \ldots, x_p(t)]^T$. In general, the dimension of the array vector x(t) is equal to p, the number of antennas in the array.

In a preferred embodiment, a batch of 100 array vectors is sampled in a 1 ms interval, and the outer products of these 100 vectors are combined to form a pxp covariance matrix for the batch. Since a batch is collected only once every 50 ms, and each batch spans only 1 ms, there is sufficient time using this technique to sample up to 50 different channels in a 50 ms interval. Those skilled in the art will appreciate that similar sampling method also may be implemented using various other values for the time intervals, number of array vectors sampled per batch, etc. Although the present description is focused upon the processing of one signal, in the preferred embodiment, the techniques described herein can be applied in parallel to signals on up to 50 channels. It will be recognized by those skilled in the art that although this sampling procedure is appropriate for the AMPS cellular standard it can be adapted to various other modulation schemes as well. In the case of a CDMA cellular network, for example, spread spectrum signals from the antenna array are digitized and passed through synchronized multichannel despreaders to produce the p-dimensional array vectors x(t) corresponding to each mobile. These vectors can then be sampled and used to form a covariance matrix for each batch in the manner outlined above. For a given mobile, a collection of the covariance matrices are then averaged over the course of a few seconds to form a pxp signal covariance matrix, R, which is normalized such that Tr R=1. This normalized covariance matrix is used as the basis for subsequent calculations, as will be described below.

In a preferred embodiment of the invention, the location of a mobile is determined from its covariance matrix R through the use of a database containing N calibrated signal signatures and associated locations, as shown in TABLE 1.

TABLE 1

| Location | Signal Signature | | |
|---|---|---|---|
| (x, y, z) | Subspace | Time Delays | Covariance |
| $d_1$ | $U_1$ | $\tau_1$ | $R_1$ |
| . | . | . | . |
| . | . | . | . |
| . | . | . | . |
| $d_N$ | $U_N$ | $\tau_N$ | $R_N$ |

The locations $d_1, \ldots, d_N$ may be two or three dimensional, and may be assigned a date upon which it was last calibrated. Each location $d_i$ has an associated signal signature that includes a signal subspace $U_i$ and possibly additional information such as a set of differential time delays $\tau_i$, and a calibrated covariance matrix $R_i$.

Although this database may be generated by various techniques, in the preferred embodiment it is generated by an empirical calibration procedure, as follows. A cellular phone and a global positioning system (GPS) receiver are placed in a vehicle which moves to various locations in a geographical region of interest. The GPS data are periodically stored and time-stamped using the GPS clock. Meanwhile, the transmitted signal from the cellular phone is received at the base station, which is also equipped with a GPS receiver, and the signal covariance matrix R is also time stamped with the GPS clock and stored. When the mobile returns, the stored data is post-processed using differential GPS correction data obtained from the base station to determine with high accuracy the location corresponding to each covariance matrix R. This data is then used to construct the calibration table database.

The signal subspace $U_i$ for a location is determined from the dominant eigenvectors of $R_i$. The dominant eigenvectors are defined as the eigenvectors of $R_i$ corresponding to the largest eigenvalues that collectively capture at least certain amount, e.g. 90%, of the total signal energy. It should be emphasized that the signal subspace may be determined by various different criteria as well.

In the preferred embodiment, the location of a mobile phone in the service area may be determined in real time as follows. Signals originating from a phone 10 at an unknown location are received at the base station 12 by multichannel receiver 26. The signal processor 28 at the base station then determines the signal covariance matrix R as described in detail above. The covariance matrix R is then compared with the set of N calibrated signal subspaces $\mathcal{U}=\{U_1, \ldots, U_N\}$ which are stored along with the associated set of N known locations $\mathcal{D}=\{d_1, \ldots, d_N\}$ in a calibration database. The measure of similarity between covariance matrix R and a given calibrated signature $U_i$ may be determined by evaluating a function $L_R$ at a location index i, $$L_R(i)=Tr\{P_iR\}=Tr\{U_iU_i^HR\},$$

where $P_i=U_iU_i^H$ is the projector onto the subspace $U_i$. The value of $L_R(i)$ measures the degree to which the measured signal covariance R coincides with the $i^{th}$ calibrated subspace $U_i$, and represents the likelihood that the mobile is at or near calibrated location $d_i$. In another embodiment, the value of $L_R(i)$ is given by the product of the non-zero eigenvalues of $P_iR$, that is, $$L_R(i)=\Pi_j\Gamma_{ij}$$

where $\{\Gamma_{ij}\}$ are the non-zero eigenvalues of $P_iR$.

By calculating the value of $L_R(i)$ for all N locations, a set $\mathcal{D}'=\{d_1', \ldots, d_M'\}$ of M likely locations can be selected by taking, for example, those locations in $\mathcal{D}$ such that the projection of the signal covariance R upon the corresponding subspaces in $\mathcal{U}$ is greater than a certain predetermined threshold value T. That is, $$\mathcal{D}'=\{d_i\epsilon\mathcal{D}:L_R(i)>T\}.$$

This set $\mathcal{D}'=\{d_1', \ldots, d_M'\}$ of M likely locations corresponds to a set $\mathcal{U}'=\{U_1', \ldots, U_M'\}$ of M likely calibrated subspaces:

$$\mathcal{U}'=\{U_i\epsilon\mathcal{U}:L_R(i)>T\},$$

and a set $\mathcal{R}'=\{R_1', \ldots, R_M'\}$ of M likely calibrated covariance matrices:

$$\mathcal{R}'=\{R_i\epsilon\mathcal{R}:L_R(i)>T\},$$

Figure 3A:
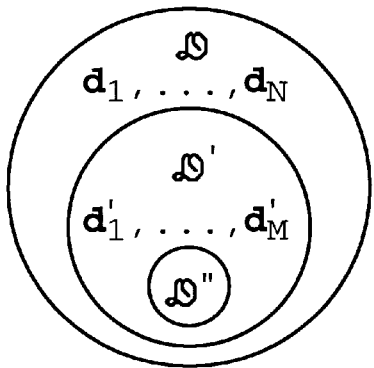
FIGS. 3A–3D illustrate the relationship between sets of data according to the present invention.
Figure 3B:
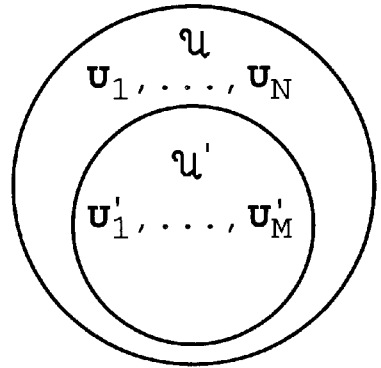
Figure 3C:
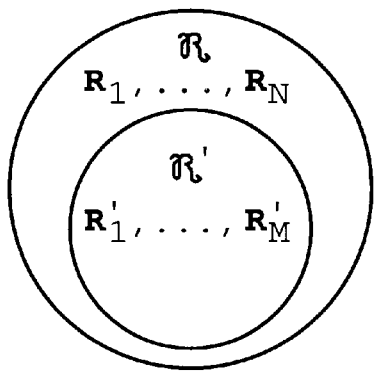

FIGS. 3A, 3B and 3C illustrate the relationships between these sets.

Because the set $\mathcal{D}'$ will usually contain multiple locations, it is desirable to reduce or eliminate these location ambiguities in order to more accurately estimate the location of the mobile.

Figure 4:
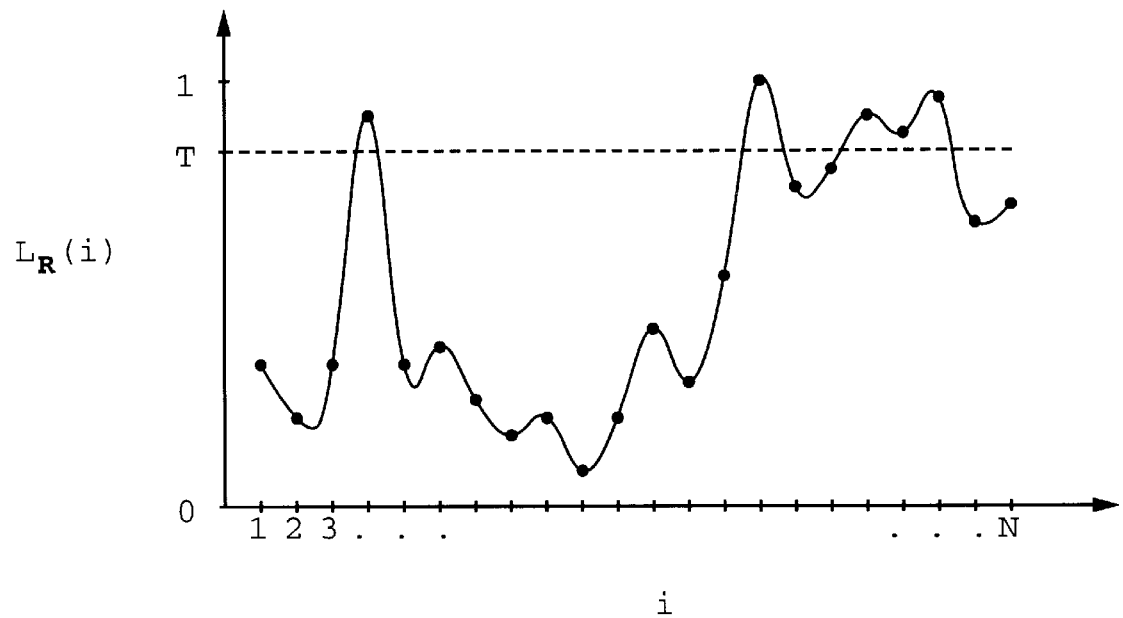
FIG. 4 is a graph of a function representing how a signal covariance matrix compares with a set of calibrated subspaces according to the present invention.
Figure 5:
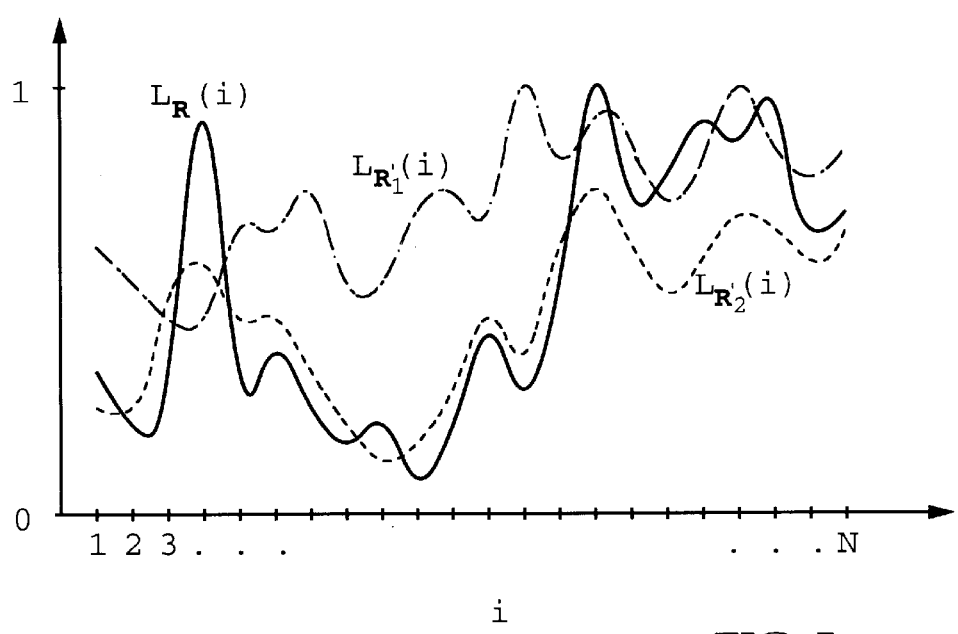
FIG. 5 is a graph of the functions shown in FIG. 4 together with similar functions to which it is compared according to the present invention.

One approach to reducing ambiguity begins with the observation that the function $L_R$ represents how signal covariance R compares to the entire collection of N calibrated signatures $\mathcal{U}$. FIG. 4 shows an example of a possible graph of the function $L_R$. Now consider the set of M functions $L_{R_1'}, \ldots, L_{R_M'}$, where $L_{R_k'}(i) = \text{Tr}\{P_i R_k'\}$. These M functions represent how each of the calibrated covariance matrices $R_1', \ldots, R_M'$ compares to the collection of calibrated subspaces in $\mathcal{U}$. For example, FIG. 5 shows graphs of two possible functions $L_{R_1'}$ and $L_{R_2'}$ (dashed) superimposed on the graph of $L_R$ (solid). Comparing the function $L_R$ with each of the functions $L_{R_1'}, \ldots, L_{R_M'}$, the actual location should be that location which corresponds to the function that is closest, with respect to some statistical metric G, to $L_R$. For example, a metric G which measures the distance between functions $L_R$ and $L_{R_k'}$, can be defined by the squared difference, $$G(L_R, L_{R_k'}) = \sum_{i=1}^{N} |L_R(i) - L_{R_k'}(i)|^2,$$

or alternatively, by the Kullback-Liebler distance, $$G(L_R, L_{R_k'}) = \sum_{i=1}^{N} \tilde{L}_R(i) \log \frac{\tilde{L}_R(i)}{\tilde{L}_{R_k'}(i)},$$

where $$\tilde{L}_R(i) = \frac{L_R(i)}{\sum_{j=1}^{N} L_R(j)}$$

and $$\tilde{L}_{R_k'}(i) = \frac{L_{R_k'}(i)}{\sum_{j=1}^{N} L_{R_k'}(j)}.$$

The actual location is selected to be the location $d_k$ for which $G(L_R, L_{R_k'})$ is the smallest. Those skilled in the art will appreciate that many other measures of statistical similarity between functions can also be used to achieve a similar result.

The above technique is advantageous and reduces location ambiguity because the function $L_R$ is compared to the functions $L_{R_k'}$ over their entire domains rather than just at single points. Thus, more information is used to compare the measured signal covariance with the calibrated subspaces, and a more accurate match can be obtained.

This technique may be used to select from the set $\mathfrak{H}'$ of likely locations a smaller set of most likely locations $\mathfrak{H}'' \subset \mathfrak{H}'$. (See FIG. 3A.) The set $\mathfrak{H}''$ can be defined as the locations in $\mathfrak{H}'$ whose corresponding functions $L_{R_k'}$ are closest to $L_R$ in the sense of G. Alternatively, $\mathfrak{H}''$ can be defined as those locations in $\mathfrak{H}'$ whose corresponding functions $L_{R_k'}$ are within a certain predetermined distance H (in the sense of G) to $L_R$. That is, $$\mathfrak{H}'' = \{d_k' \in \mathfrak{H}' : G(L_R, L_{R_k'}) < H\}.$$

By appropriate adjustment of the constants T and H in dependence upon parameters such as the degree of tolerance desired and the amount of noise present in a particular system, the set $\mathfrak{H}''$ should contain one or more locations that have a high probability of being the actual location of the mobile.

Figure 6:
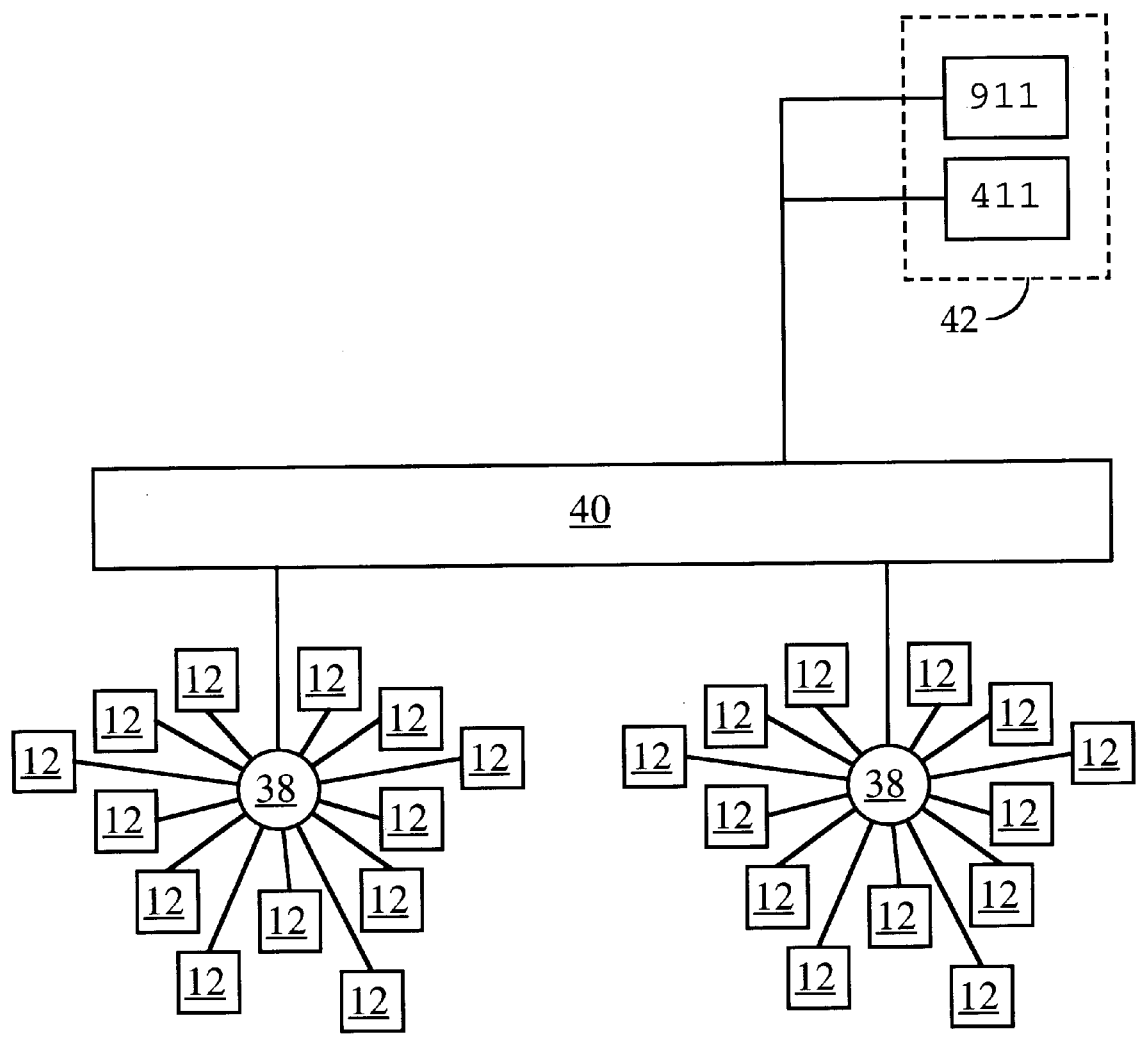
FIG. 6 is a block diagram of a communication system network according to the present invention.

If the set $\mathfrak{H}''$ contains more than one location, then other techniques can be used to further reduce ambiguity. For example, this technique can be used in the situation where information from multiple base stations is available to provide additional ambiguity reduction. An example of such a system is shown in FIG. 6. Individual base stations 12 are connected to metropolitan hubs 38, which collect and coordinate location information for cellular phones in different metropolitan areas.

To reduce ambiguity in such a system, signal covariance matrices from a single mobile are measured every few seconds at two nearby base stations, and then sent to their common hub 38. In the hub 38 the matrices are compared to sets $\mathcal{U}_1$ and $\mathcal{U}_2$ of calibrated subspaces corresponding to the two different base stations having respective sets of calibrated locations $\mathfrak{H}_1$ and $\mathfrak{H}_2$. Relative to each base station a set of likely locations is determined, producing sets $\mathfrak{H}_1'$ and $\mathfrak{H}_2'$ with respect to each base station, just as before. Then, rather than determining subsets $\mathfrak{H}_1''$ and $\mathfrak{H}_2''$ independently, the information from both base stations is combined to provide additional ambiguity reduction, as follows.

Figure 3D:
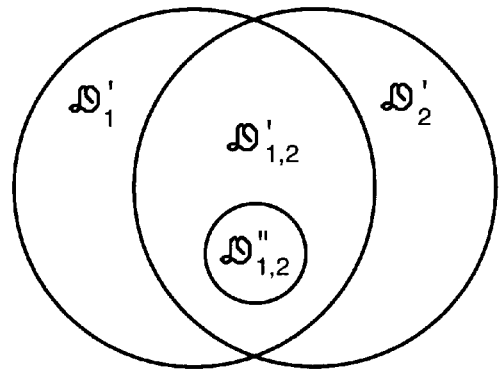

Because the actual location must be common to both base stations, we need only consider the set $\mathfrak{H}_{1,2}'$ of those locations common to both $\mathfrak{H}_1'$ and $\mathfrak{H}_2'$, i.e. $\mathfrak{H}_{1,2}' = \mathfrak{H}_1' \cap \mathfrak{H}_2'$. If there is more than one location in $\mathfrak{H}_{1,2}'$ then we can select a smaller set of most likely common locations $\mathfrak{H}_{1,2}'' \subset \mathfrak{H}_{1,2}'$. (See FIG. 3D.) The set $\mathfrak{H}_{1,2}''$ can be defined in various ways. For example, define $G_1(k) = G(L_R, L_{R_k'})$, where R is the covariance matrix measured at the first base station and $R_k'$ is the calibrated covariance matrix of the $k^{th}$ likely location relative to the first base station. Define $G_2(k)$ similarly for the second base station. Then $\mathfrak{H}_{1,2}''$ may be defined by $$\mathfrak{H}_{1,2}'' = \{d_k' \in \mathfrak{H}_{1,2}' : G_1(k) + G_2(k) < F\},$$

where F is a predetermined constant. Because this technique simultaneously compares the signals with both the calibrated databases, it provides a higher degree of accuracy and ambiguity reduction than the technique of comparing signals with the databases independently. It will be appreciated by those skilled in the art that this technique generalizes in a straightforward way to three or more base stations.

The accurate and reliable location information provided by the present invention can be used for many important applications. For example, location information can be sent by the cellular operator to third party service providers 42 for various uses. For example, it can be used in conjunction with 911 calls to provide dispatchers with immediate locations for callers under emergency circumstances. Location information also can be used for enhanced 411 service, i.e. for real time caller location associated services, such as providing directions to lost motorists. The location information can be sent to an automatic road toll management system or used for smart vehicular scheduling on a highway network. For example, the present invention may be used to provide enhanced 911 response of emergency vehicles by tracking the locations of emergency vehicles, coordinating location information with street map databases, and communicating specific optimal directions to appropriate vehicles. Such an enhanced 911 service is an important advantage of the present invention. Location information also can be used for remote monitoring of health conditions of patients, for remote control and/or navigation of robot devices, and for numerous other such special purpose applications.

The foregoing important applications, as well as many others, can be integrated into a wireless arena management (WAM) system, shown in FIG. 6, which makes use of location information determined by individual base stations 12 and/or hubs 38 to manage metro networks individually and collectively. For example, location information sent from individual base station sites 12 to metro hubs 38 can be used to assist in hand-off between cells, for automatic trunking, for channel borrowing, for channel capacity optimization, to more efficiently allocate cellular frequencies, and to increase the capacity of the metro network. On a global level, a WAM hub 40 links the metro hubs 38 and provide access to third party service centers 42, for example, appropriate regional 911 and 411 service centers. It is a significant feature of the present invention that high bandwidth communication lines are not required to determine and communicate location information within such a network. Accordingly, the present invention enables for the first time the ability to use location information to actively monitor and/or manage all the wireless traffic in a network.

It should be noted that the present technique is applicable to other techniques for matching a measured value to a collection of possible values. For example, the present technique is easily adapted for use in reducing ambiguity in direction finding (DF) based techniques for location determination. It may also be adapted to various other analogous pattern recognition problems. In addition, it should be noted that the foregoing details may be varied in many ways without departing from the general spirit and scope of the invention. Accordingly, the scope of the present invention should be determined from the following claims and their legal equivalents.

What is claimed is:

1. In a system for wireless transmitter location finding, a method for calculating a set of likely locations of a transmitter, the method comprising:

(a) measuring at a base station a signal covariance R associated with the transmitter;

(b) evaluating a function $L_R(i)$ comparing R with a calibrated subspace associated with a location index i;

(c) evaluating a function $L_{R_k}'(i)$ comparing $R_k'$ with the calibrated subspace associated with location index i, where $R_k'$ is a calibrated covariance associated with a location index k;

(d) calculating a distance G between the functions $L_R$ and $L_{R_k}'$; and (e) selecting a set of location indices k such that the distance G between R and $R_k'$ is small.

2. The method of claim 1 wherein the value of $L_R(i)$ is a trace of a projection of R onto a calibrated subspace associated with location index i.

3. The method of claim 1 wherein the value of $L_R(i)$ is a product of non-zero eigenvalues of a projection of R onto a calibrated subspace associated with location index i.

4. The method of claim 1 wherein the value of $L_{R_k}'(i)$ is a trace of a projection of $R_k'$ onto a calibrated subspace associated with location index i.

5. The method of claim 1 wherein the value of $L_{R_k}'(i)$ is a product of non-zero eigenvalues of a projection of $R_k'$ onto a calibrated subspace associated with location index i.

6. The method of claim 1 wherein the distance G is the Kullback-Liebler distance between $L_R$ and $L_{R_k}'$.

7. The method of claim 1 wherein the distance G is the squared difference between $L_R$ and $L_{R_k}'$.

8. An apparatus for location finding in a wireless communications system, the apparatus comprising:

(a) a multichannel receiver for coherently receiving signals originating from a transmitter;

(b) a signal processor connected to the multichannel receiver for determining a set of likely locations from the received signals; and (c) a memory device accessible by the processor for storing signal signature calibration data;

wherein the signal processor determines the set of likely locations from the received signals in accordance with the following procedure:

(i) calculating a signal covariance R from the received signals;

(ii) evaluating a function $L_R(i)$ comparing R with a calibrated subspace associated with a location index i;

(iii) evaluating a function $L_{R_k}'(i)$ comparing $R_k'$ with the calibrated subspace associated with location index i, where $R_k'$ is a calibrated covariance associated with a location index k;

(iv) calculating a distance G between the functions $L_R$ and $L_{R_k}'$; and (v) selecting a set of location indices k such that the distance G between R and $R_k'$ is small.

9. The apparatus of claim 8 wherein the value of $L_R(i)$ is a trace of a projection of R onto a calibrated subspace associated with location index i.

10. The apparatus of claim 8 wherein the value of $L_R(i)$ is a product of non-zero eigenvalues of a projection of R onto a calibrated subspace associated with location index i.

11. The apparatus of claim 8 wherein the value of $L_{R_k}'(i)$ is a trace of a projection of $R_k'$ onto a calibrated subspace associated with location index i.

12. The apparatus of claim 8 wherein the value of $L_{R_k}'(i)$ is a product of non-zero eigenvalues of a projection of $R_k'$ onto a calibrated subspace associated with location index i.

13. The apparatus of claim 8 wherein the distance G is the Kullback-Liebler distance between $L_R$ and $L_{R_k}'$.

14. The apparatus of claim 8 wherein the distance G is the squared difference between $L_R$ and $L_{R_k}'$.

15. In a system for wireless transmitter location finding, a method for calculating a set of likely locations of a transmitter, the method comprising:

(a) measuring at a base station a signal covariance R associated with the transmitter;

(b) calculating a projection of R onto a calibrated subspace associated with a location index i;

(c) repeating step (b) for a plurality of location indices to obtain a plurality of projections; and (d) calculating from the projections the set of likely locations.

16. The method of claim 15 wherein step (d) comprises calculating traces of the projections.

17. The method of claim 15 wherein step (d) comprises calculating products of non-zero eigenvalues of the projections.

* * * * *